US012686974B2

(12) United States Patent
Lee et al.

(10) Patent No.: US 12,686,974 B2
(45) Date of Patent: Jul. 21, 2026

(54) FIBER MOLDING SCREEN PORE TRAJECTORY

(71) Applicants:Peridot Print LLC, Palo Alto, CA (US); NANYANG TECHNOLOGICAL UNIVERSITY, Singapore (SG)

(72) Inventors: Kok Peng Marcian Lee, Singapore (SG); Jia Wei Chew, Singapore (SG); Jun Zeng, Palo Alto, CA (US)

(73) Assignees: Peridot Print LLC, Palo Alto, CA (US); NANYANG TECHNOLOGICAL UNIVERSITY, Singapore (SG)

( * ) Notice: Subject to any disclaimer, the term of this patent is extended or adjusted under 35 U.S.C. 154(b) by 179 days.

(21) Appl. No.: 18/685,669

(22) PCT Filed: Aug. 22, 2021

(86) PCT No.: PCT/US2021/047042
§ 371 (c)(1),
(2) Date: Feb. 22, 2024

(87) PCT Pub. No.: WO2023/027680
PCT Pub. Date: Mar. 2, 2023

(65) Prior Publication Data
US 2024/0352680 A1 Oct. 24, 2024

(51) Int. Cl.
| | |
|---|---|
| *B33Y 50/02* | (2015.01) |
| *D21J 7/00* | (2006.01) |
| *B33Y 10/00* | (2015.01) |
| *B33Y 30/00* | (2015.01) |
| *B33Y 80/00* | (2015.01) |

(52) U.S. Cl.
CPC ................ *D21J 7/00* (2013.01); *B33Y 10/00* (2014.12); *B33Y 30/00* (2014.12); *B33Y 50/02* (2014.12); *B33Y 80/00* (2014.12)

(58) Field of Classification Search
CPC ..................................................... B33Y 50/02
USPC .......................................................... 162/100
See application file for complete search history.

(56) References Cited

U.S. PATENT DOCUMENTS

| | | | |
|---|---|---|---|
| 4,994,148 | A | 2/1991 | Shetka |
| 5,795,443 | A | 8/1998 | Greve |
| 6,918,997 | B2 | 7/2005 | Goto et al. |
| 9,902,123 | B1 | 2/2018 | Hipol et al. |

(Continued)

FOREIGN PATENT DOCUMENTS

| | | |
|---|---|---|
| JP | 08-197553 A | 8/1996 |
| JP | 11-013000 A | 1/1999 |
| KR | 10-2019-0055262 A | 5/2019 |

*Primary Examiner* — Jacob T Minskey
(74) *Attorney, Agent, or Firm* — Michael Dryja

(57) ABSTRACT

In an example in accordance with the present disclosure, a fiber molding screen is described. The fiber molding screen includes a first region and a second region. The fiber molding screen includes a first set of pores formed within the first region. Each pore of the first set of pores has a first pore trajectory angle between a longitudinal axis of the pore and the first region surface. The fiber molding screen also includes a second set of pores formed within the second region. Each pore of the second set of pores has a second pore trajectory angle between a longitudinal axis of the pore and the second region surface. The second pore trajectory angle is different than the first pore trajectory angle.

12 Claims, 6 Drawing Sheets

(56) References Cited

U.S. PATENT DOCUMENTS

| 10,435,848 | B2 | 10/2019 | Andersson et al. |
| 2019/0376238 | A1 | 12/2019 | Andersson et al. |

400

START

Determine, per region, a tilt angle of a surface of a fiber molding screen
401

Determine, per region, a porosity of the surface of the fiber molding screen
402

Calculate, per region and based on the tilt angle and porosity, a pore trajectory angle for regions of the fiber molding screen
403

END

500

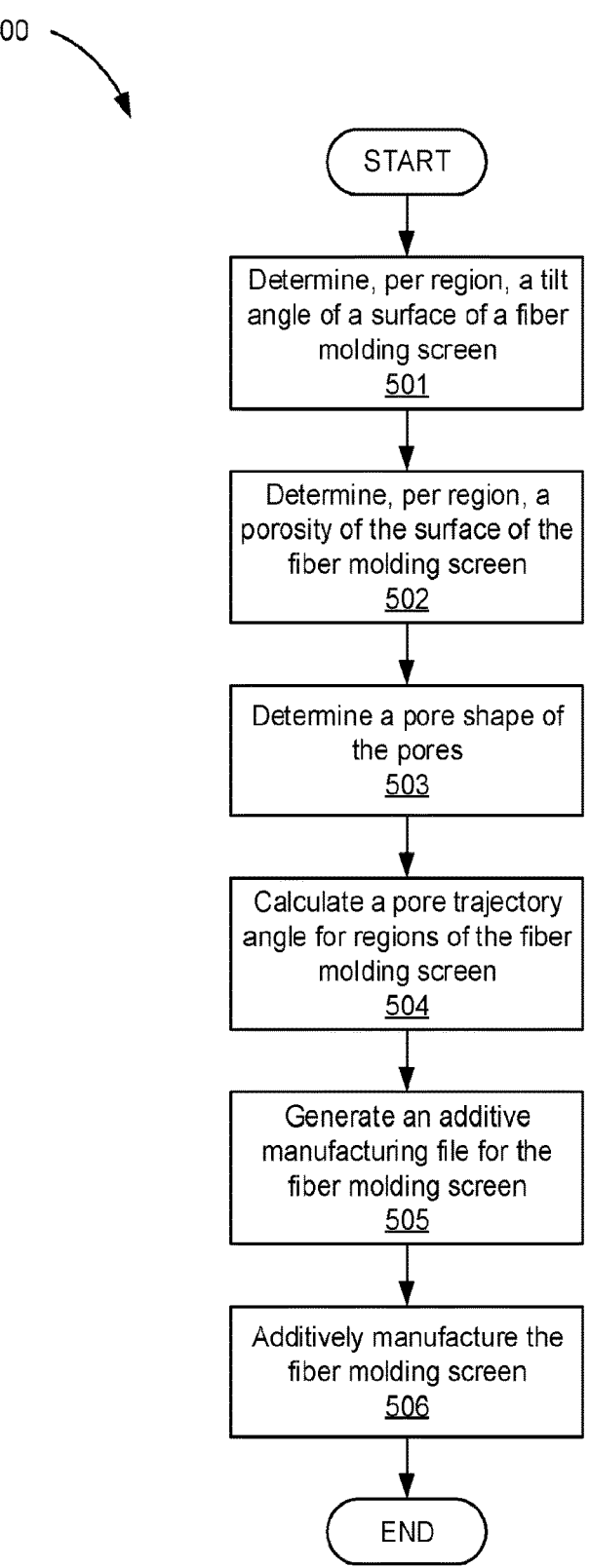

START

Determine, per region, a tilt angle of a surface of a fiber molding screen
501

Determine, per region, a porosity of the surface of the fiber molding screen
502

Determine a pore shape of the pores
503

Calculate a pore trajectory angle for regions of the fiber molding screen
504

Generate an additive manufacturing file for the fiber molding screen
505

Additively manufacture the fiber molding screen
506

END

*Fig. 5*

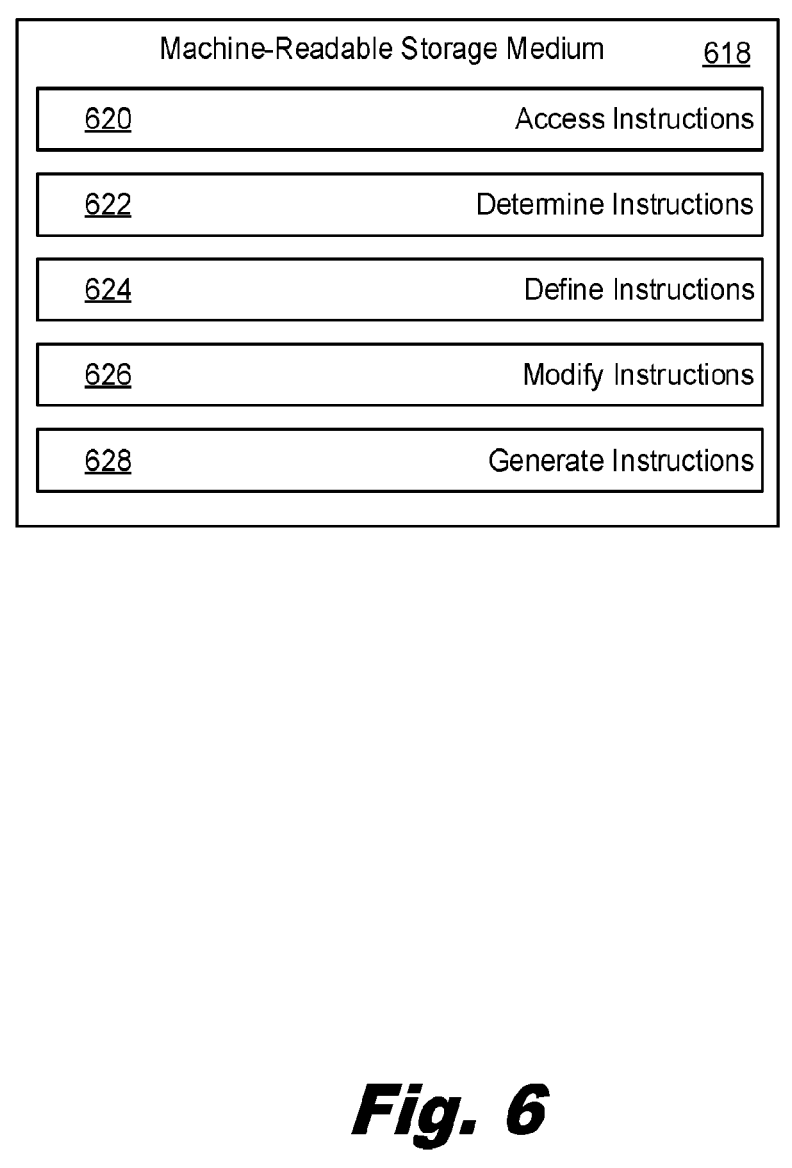

| Machine-Readable Storage Medium | 618 |
| --- | --- |
| 620 | Access Instructions |
| 622 | Determine Instructions |
| 624 | Define Instructions |
| 626 | Modify Instructions |
| 628 | Generate Instructions |

*Fig. 6*

FIBER MOLDING SCREEN PORE TRAJECTORY

BACKGROUND

Fiber molding refers to an operation where a fibrous material such as recycled paper, cardboard, or other natural fibers are dispersed as a slurry. The slurry is compressed against a shaped screen and water is removed from the slurry leaving a hardened molded fiber product in a shape to match the screen. Examples of molded fiber products include paper products such as paper plates, food containers, and protective packaging, such as for any variety of shipped goods. Once used, such products may be recycled, broken down into a slurry, and formed into new molded fiber products.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 5 is a flowchart of a method for generating a fiber molding screen with pores with different pore trajectory angles, according to an example of the principles described herein.

FIG. 6 depicts a non-transitory machine-readable storage medium for generating a fiber molding screen with pores with different pore trajectory angles, according to an example of the principles described herein.

Figure 1:
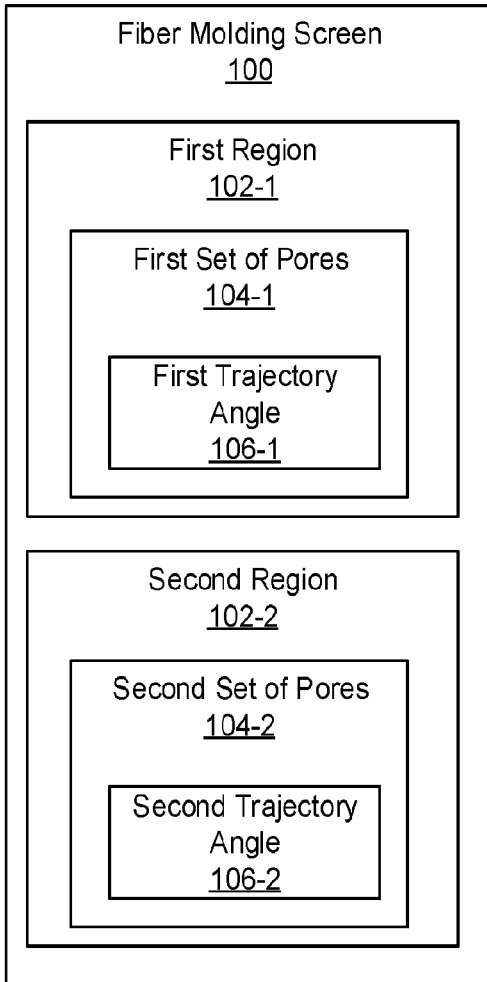
FIG. 1 is a block diagram of a fiber molding screen with pores with different pore trajectory angles, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Fiber molding refers to an operation where a fibrous material such as recycled paper, cardboard, or other natural fibers are dispersed as a slurry and compressed against a shaped screen, such that upon removal of the water a molded fiber product is formed in a shape of the screen. Examples of molded fiber products include paper products such as paper plates, food containers, and protective packaging, such as for any variety of shipped goods. While particular reference has been made to a few examples of molded fiber products, fiber molding may be used to generate a wide variety of products. Once used, molded fiber products may be recycled, broken down into a slurry, and formed into new molded fiber products. That is, molded fiber products are renewable and biodegradable. Accordingly, such products are desirable due to their recyclability and reduced impact on the environment.

In general, a fiber molding die includes two components, a screen against which the fiber accumulates to make the pulped object, and a form tool that supports the screen. Both of these components include perforations through which the fluid from the slurry is drawn. In the case of the screen, the fluid flows from the slurry side to a side of the screen that sits against the form tool. In the case of the form tool, the fluid flows from the screen side to the plenum, i.e., a region to where the fluid is drawn and retained.

The fiber molding die is dipped into a fiber slurry bath and a vacuum suction is applied through the screen such that the fibers in the slurry collect on the screen while water passes through. While still under vacuum, the fiber molding die is lifted out of the fiber slurry bath, after which the fiber deposit is ejected from the fiber molding die and dried in an oven to form the molded fiber product.

In general, the formation of these fiber molding components may be manual, complex, and cumbersome. For example, the fiber molding screen may be made of a metal mesh that is hammered into place over a form tool. The form tool may be a machined metal block with holes drilled through. Accordingly, forming these fiber molding tools is labor intensive and may prevent the beneficial use of molded fiber products.

Moreover, modifications to the screen may be limited to a few parameters like mesh wire density and arrangement, which in turn limits the control of fiber slurry flow and deposition. That is, fiber slurry flow behavior during molded fiber manufacturing defines the final characteristics of the fiber molded product. Ineffective fiber slurry flow may result in a fiber molded product with non-uniform thickness and reduced mechanical strength. This is because fiber retention on the surface of the screen, rather than transport away from the die, depends on factors including fiber length being larger than pore diameter and fiber orientation being parallel to the screen. Accordingly, as modifications to the fiber molding screen may be limited, so may be the control over the quality of the molded fiber product.

Accordingly, the present specification provides for the automated and additive manufacturing of the fiber molding screen such that certain parameters that enhance the quality of the fiber molded product may be controlled. That is, the present specification describes a method of fiber molding screen fabrication that manipulates slurry flow behavior and enhances uniformity of fiber deposition on the screen surface, which enhances the uniformity and strength of the molded fiber product.

As noted above, fiber molding screens impact the quality of the molded fiber product. For example, uneven fiber bed thickness of a fiber molded product may result when a fiber molding screen exhibits ineffective fiber slurry flow and deposition. Ineffective fiber slurry flow and deposition may be rooted in the arrangement of pores on the fiber molding screen. As such, the present disclosure describes a fiber molding screen wherein a pore trajectory, i.e., a pore path through the screen, is selected to enhance water drainage and fiber retention. In some examples, the angle of the pore path may be selected based on a screen tilt angle and a surface porosity, to induce desirable fiber slurry flow behaviors to generate fiber molded products with enhanced thickness uniformity.

Specifically, additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified. 3D objects may be formed using any variety of additive manufacturing systems including fusing agent-based systems, a binding agent-based system, selective laser sintering, selective laser melting, fused metal deposition, and stereolithography.

The present specification describes a fiber molding screen that is additively manufactured. The fiber molding screen includes a first region and a second region. The fiber molding screen includes a first set of pores formed within the first region. Each pore of the first set of pores has a first pore trajectory angle between a longitudinal axis of the pore and the first region surface. The fiber molding screen also includes a second set of pores formed within the second region. Each pore of the second set of pores has a second pore trajectory angle between a longitudinal axis of the pore and the second region surface. The second pore trajectory angle is different than the first pore trajectory angle.

The present specification also describes a method. According to the method, a tilt angle is determined per region of a fiber molding screen. A porosity per region of the fiber molding screen is also determined. Based on the tilt angle and porosity for the region, a pore trajectory angle is determined for pores within the region.

The present specification also describes a non-transitory machine-readable storage medium encoded with instructions executable by a processor. The machine-readable storage medium includes instructions to, when executed by the processor, cause the processor to access a digital model of a fiber molding screen to be fabricated, the digital model having a first region and a second region. The instructions are also executable by the processor, to cause the processor to determine, per region of the fiber molding screen 1) a tilt angle of a surface of the region and 2) a porosity of the surface of the region. The instructions are also executable by the processor, to cause the processor to 1) define a first et of pores for the first region, each pore of the first set of pores having a first pore trajectory angle between a longitudinal axis of the pore and the first region surface and 2) define a second set of pores for the second region, each pore of the second set of pores having a second pore trajectory angle between a longitudinal axis of the pore and the second region surface. The second pore trajectory angle is different than the first pore trajectory angle. The instructions are also executable by the processor, to cause the processor to 1) modify the digital model of the fiber molding screen to include the first set of pores in the first region and the second set of pores in the second region and 2) generate an additive manufacturing file for the fiber molding screen with the first set of pores and the second set of pores represented in the digital model of the fiber molding screen.

In summary, using such a 3D-printed fiber molding screen may, for example, 1) allow for screen fabrication to control slurry flow; 2) provide for molded fiber products with increased thickness uniformity; and 3) enhance drainage time to increase molded fiber product strength. However, it is contemplated that the compute devices disclosed herein may address other matters and deficiencies in a number of technical areas, for example.

As used in the present specification and in the appended claims, the term "pore trajectory angle" refers to an angle between a longitudinal axis of a pore through the fiber molding screen and an exterior surface of the fiber molding screen.

Further, as used in the present specification and in the appended claims, the term "tilt angle" refers to an angle between an exterior surface of the fiber molding screen and a horizontal plane, which horizontal plane may be a reference plane that is defined by the surface of the slurry bed in which the fiber molding screen is disposed.

Still further, as used in the present specification and in the appended claims, the term "a number of" or similar language is meant to be understood broadly as any positive number including 1.

Turning now to the figures, FIG. 1 is a block diagram of a fiber molding screen (100) with pores with different pore trajectory angles (106), according to an example of the principles described herein. As described above, the fiber molding screen (100) is used to form a molded fiber product. That is, a fiber molding die includes two components, a fiber molding screen (100) against which the fiber accumulates to make the pulped object, and a form tool that supports the fiber molding screen (100).

Each of these components include perforations. In the case of the fiber molding screen (100), fluid from the slurry is drawn through these perforations. For example, in a fiber molding screen or form tool, a slurry of fibrous material and a fluid is on one side of the form tool and screen. Via vacuum pressure, the fluid is drawn in a direction such that the fibrous material of the slurry is compressed against the fiber molding screen (100). As a fiber molding screen (100) is in a desired shape of a molded fiber object, the fibrous material conforming to the fiber molding screen (100) molds the product in the desired shape.

Figure 2:
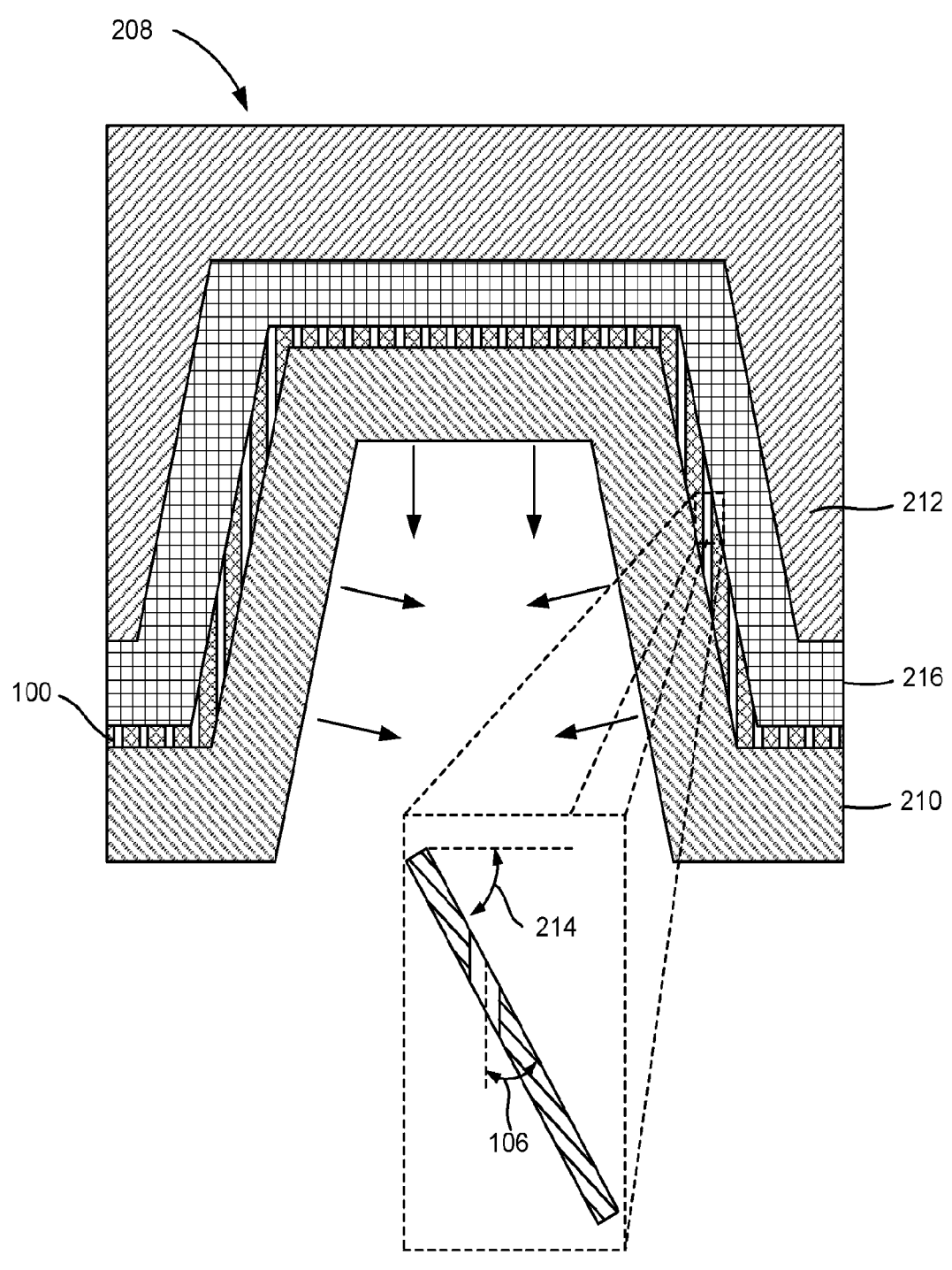
FIG. 2 depicts a fiber molding screen with pores with different pore trajectory angles, according to an example of the principles described herein.
Figure 3:
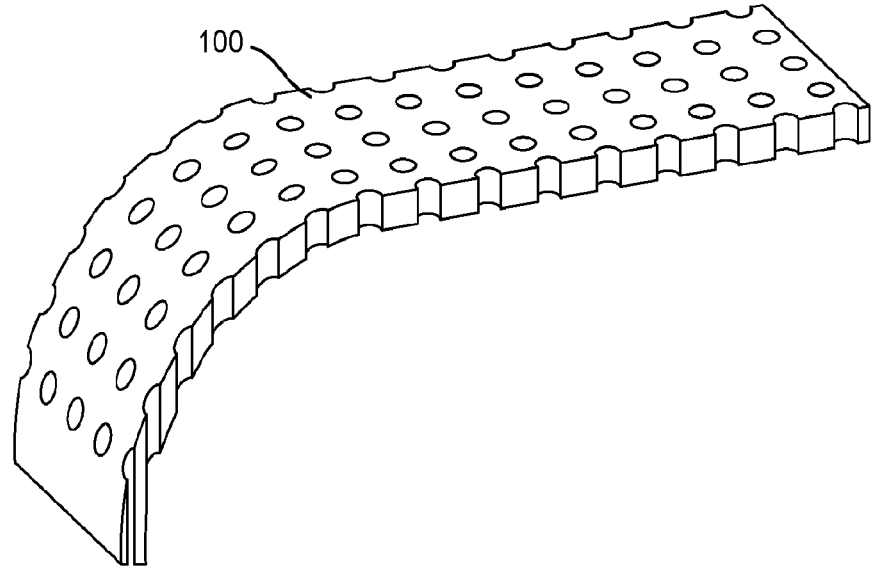
FIG. 3 depicts a fiber molding screen with pores with different pore trajectory angles, according to an example of the principles described herein.

The fiber molding screen (100) may include various regions (102-1, 102-2), where different regions (102) may be defined as having different tilt angles, or angles relative to a horizontal plane. For example, a first region (102-1) may be parallel to the horizontal plane while a second region (102-2) may be perpendicular, or otherwise non-parallel, to the horizontal plane. FIGS. 2 and 3 below depict examples of different regions (102) which may have different tilt angles.

As described above, each region (102) has a set (104) of pores. Specifically, a first set (104-1) of pores is formed within the first region (102-1) while a second set (104-2) of pores is formed within the second region (102-2). Each pore within each set (104) may have a pore trajectory angle (106). As described above, the pore trajectory angle (106) is defined as an angle between a longitudinal axis through the pore and the surface of the fiber molding screen (100). In the present fiber molding screen (100), each pore of the first set (104-1) of pores has a first pore trajectory angle (106-1) and each pore of the second set (104-2) of pores has a second pore trajectory angle (106-2). The second pore trajectory angle (106-2) may be different than the first pore trajectory angle (106-1). That is, in other fiber molding screens (100), each pore may be orthogonal to the surface of the fiber molding screen (100). That is the pore trajectory angle of all pores of the fiber molding screen (100) may be the same. However, doing so may result in inefficient water drainage and fiber retention. Accordingly, in the present specification, the pore trajectory angle (106) may vary per region (102). As different regions (102) may have different tilt angles, the pore trajectory angles (106) may vary per tilt angle.

Doing so may increase fiber retention on the surface of the fiber molding screen (100). That is, the flow of fibers through the fiber molding screen (100) may depend on the tilt angle across the surface of the fiber molding screen (100). That is, as the contours of the fiber molding screen (110) change, so do does the ability of the fiber molding screen (100) to retain fibers.

Accordingly, in the present fiber molding screen (100), the pore trajectory angle (106) may change as the tilt angle changes to ensure more of the fibrous material is retained on the surface of the fiber molding screen (100), thus enhancing thickness uniformity across the fiber molded product. In a particular example, both the first pore trajectory angle (106-1) and the second pore trajectory angle (106-2) may be non-orthogonal. A non-orthogonal pore trajectory angle (106) may result in increased fiber retention and a slower water drainage, which slower water drainage also contributes to enhance fiber molded product strength.

As described above, the present fiber molding screen (100) has pores with non-uniform pore trajectory angles (106). The particular pore trajectory angles (106) for the set (104) of pores in any particular region (102) may be determined based on any number of factors. For example, as described above, the pore trajectory angles (106) of pores within a particular region (102) may be selected based on a tilt angle of that region (102). For example, the first pore trajectory angle (106-1) may be selected based on a tilt angle of the first region (102-1) while the second pore trajectory angle (106-2) may be selected based on a tilt angle of the second region (102-2).

In an example, the pore trajectory angles (106) of pores within a particular region (102) may be selected based on a porosity of the region (102). For example, the first pore trajectory angle (106-1) may be selected based on a porosity of the first region (102-1) while the second pore trajectory angle (106-2) may be selected based on a porosity of the second region (102-2). That is, porosity (which is a quantity of the surface that has pores defined thereon) determines the water drainage and fiber retention within that region (102). For example, the more pores on a region (102), i.e., the higher the porosity, the more quickly water drains from that region (102). Accordingly, the pore trajectory angle (106) within that region may be made steeper so as to retain more fibers on the surface of the fiber molding screen (100).

As such, the fiber molding screen (100) of the present specification may be additively manufactured, thus enhancing the customizable features of the fiber molding screen (100). Of particular note, a fiber molding screen (100) may be additively manufactured to have pore trajectory angles (106) that enhance the ability of the fiber molding screen (100) to retain slurry fibers on the surface of the fiber molding screen (100). As any fibers that pass through the fiber molding screen (100) do not become part of the fiber molded product, such fibers may be wasted and the overall fiber molded product, by having less fibers formed thereon, may be thinner, weaker, and non-uniform. Accordingly, by preserving more of the fibers on the surface, more uniform, stronger, and thicker fiber molded products may be produced.

FIG. 2 depicts a fiber molding screen (100) screen with pores with different pore trajectory angles (106), according to an example of the principles described herein. As described above, a fiber molding die (208) may include a form tool (210) and a fiber molding screen (100) and may filter material elements from a fluid. In some examples, the fluid may be water or another type of suitable fluid in which pulp material, e.g., paper, wood, fiber crops, bamboo, or the like, is mixed into a slurry (212). The material elements may be, for instance, fibers of the pulp material. In these examples, the sizes of the perforations are defined by the sizes of the fibers in the slurry. For instance, the pores are sized to prevent or limit the flow of the fibers into the pores.

In operation, a vacuum, or reduced pressure, is be applied from a side of the form tool (210) opposite the fiber molding screen (100) when the fiber molding die (208) is immersed in a fiber slurry (212) containing a material (216). As fluid in the fiber slurry (212) flows through the fiber molding screen (100) and the form tool (210) as denoted by the arrows, the material (216) in the slurry (212) is accumulated and compressed onto the fiber molding screen (100) and takes the shape of the fiber molding screen (100). The material (216) pressed against the fiber molding screen (100) is then dried to form a molded fiber product in the shape of the fiber molding screen (100).

FIG. 2 depicts an example of the screen (100) having perforations and a form tool (210) also having perforations. For simplicity, the perforations of the form tool (210) have been omitted. As shown, the fiber molding screen (100) overlays the form tool (210). In an example, the form tool (210) is thicker than the fiber molding screen (100) and is more rigid than the fiber molding screen (100). As such, the form tool (210) provides structural support for the fiber molding screen (100). The form tool (210) may be formed of a rigid material, such as a metal, a plastic, a ceramic, and/or the like.

FIG. 2 also depicts the pore trajectory angle (106) and tilt angle (214) of a particular region (FIG. 1, 102). As described above, the pore trajectory angle (106) defines an angle between a longitudinal axis of the pore and a surface of a region (FIG. 1, 102) of the fiber molding screen (100) where the pore is found. By comparison, the tilt angle (214) refers to an angle of the surface of the fiber molding screen (100) in that region (FIG. 1, 102) and a horizontal reference plane.

The pores in a first region (FIG. 1, 102-1) of the fiber molding screen (100), which first region (FIG. 1, 102-1) may be a top surface depicted in FIG. 2, may be parallel to the horizontal reference plane, may have a first pore trajectory angle (FIG. 1, 106-1), which may be 90°. By comparison, the pores in a second region (FIG. 1, 102-2), which second region may be an angled surface depicted in FIG. 2 that is not parallel to the horizontal reference plane, may have a second pore trajectory angle (FIG. 1, 106-2), which may be an angle other than 90°. As depicted in FIG. 2, rather than having pores each with a similar pore trajectory angle (106). i.e., an angle relative to the surface of the fiber molding screen (100), the fiber molding screen (100) of the present application may have pores with different pore trajectory angles (106), which may enhance the uniformity of fiber retention across the surface of the fiber molding screen (100).

In an example, the first pore trajectory angle (FIG. 1, 106-1) and the second pore trajectory angle (FIG. 1, 106-2) may be selected based on a reference plane, which reference plane may be a surface of the fiber slurry bed, or a horizontal plane. In this example, the first and second pore trajectory angles (FIG. 1, 106-1, 106-2) may be different from one another, but the angle between a longitudinal axis of the first set (FIG. 1, 104-1) of pores and the reference plane may be the same as the angle between a longitudinal axis of the second set (FIG. 1, 104-2) of pores and the reference plane. That is, the longitudinal axis of any pore, whether in the first region (FIG. 1, 102-1) or the second region (FIG. 1, 102-2), may be perpendicular to the reference and horizontal plane. Doing so may provide for a fiber molded product with greater thickness uniformity. That is, as described above, the tilt angle at the second region (FIG. 1, 102-2) may impact the flow of fluid through the fiber molding screen (100) and the fiber retention on the surface. Accordingly, by adjusting the pore trajectory angle (FIG. 1, 106-2) on the second region (FIG. 1, 102-2), enhanced fiber retention may be promoted which increase the fiber molded product thickness uniformity.

Description will now be provided of test results of various fiber molding screens (100). Specifically, a series of test fiber molding screens (100) were 3D-printed, and the slurry flow behavior characterized by quantifying the filtration rate and also visual observation of the deposited fibers. The screen parameters assessed include the pore trajectory angle (106), screen tilt angle (214), and the surface porosity.

As described above, the pore trajectory angle (106) may be a variety of values including normal or angled. That is, additively manufacturing the fiber molding screen (100) allows for a variety of pore trajectory angles (106) to be implemented.

In the test, the flow behavior of slurry with a 0.25% consistency was observed visually using a video camera. Visualization was performed three times per screen to ensure repeatability of results. A flat fiber molding screen (100) with pores normal to the fiber molding screen (100), i.e., a pore trajectory angle (106) of 90°, P90, and a tilt angle (214) of 0°, S0, was assessed to serve as a benchmark. Observations indicated that 1) the slurry flow towards the fiber molding screen (100) due to the vacuum dictates the deposition of the fibers; 2) compared to pore trajectory angles (106) of 90°, P90, the fibers deposit faster for smaller pore angles during the draining under vacuum, and 3) at the end of the drainage, fiber molding screens (100) with a 30° pore trajectory angle (106) and a 60° tilt angle (214), P30-S60, and fiber molding screens (100) with a 45° pore trajectory angle (106) and a 45° tilt angle (214), P45-S45, were fully covered by fibers.

To quantify the performance of different 3D-printed fiber molding screens (100), the time taken for the slurry height in the test rig to fall by 10 millimeters (mm) upon the application of vacuum was recorded. This is referred to as "drainage time". The slurries used in the experiments had 0.25% or 1% consistencies. The time taken for the drainage of water without any fiber was also measured to provide a baseline for comparison. The drainage times are listed in Tables 1-4 below.

TABLE 1

| | Pore trajectory vertically downwards (P30-S60) | Pore trajectory normal to screen (P90-S60) |
|---|---|---|
| Water | 0.37 ± 0.01 | 0.37 ± 0.02 |
| 0.25% slurry | 2.81 ± 0.21 | 1.6 ± 0.19 |
| 1% slurry | 5.50 ± 0.51 | 4.47 ± 0.25 |

TABLE 2

| | Pore trajectory vertically downwards (P45-S45) | Pore trajectory normal to screen (P90-S45) |
|---|---|---|
| Water | 0.31 ± 0.02 | 0.33 ± 0.01 |
| 0.25% slurry | 1.88 ± 0.31 | 1.13 ± 0.28 |
| 1% slurry | 5.15 ± 0.53 | 4.63 ± 0.28 |

TABLE 3

| | Pore trajectory vertically downwards (P60-S30) | Pore trajectory normal to screen (P90-S30) |
|---|---|---|
| Water | 0.25 ± 0.04 | 0.27 ± 0.03 |
| 0.25% slurry | 1.42 ± 0.10 | 1.21 ± 0.16 |
| 1% slurry | 4.81 ± 0.40 | 4.63 ± 0.19 |

TABLE 4

| | Pore trajectory normal to screen (P90-S0) |
|---|---|
| 0.25% slurry | 0.91 ± 0.07 |
| 1% slurry | 4.28 ± 0.14 |

As described above, drainage time impacts the uniformity of fiber deposits. The drainage time of experiments with 0.25% slurry is consistent with visual observations of flow behavior, where fiber pads formed on P90 screens may exhibit defects. Specifically, the defects are exhibited as pore mouths without fiber deposit as the fibers have permeated through, which gave shorter drainage times. Similar trends were observed in 1% slurry, albeit a smaller difference is observed between the two pore layouts of the same screen tilt angle (214). This may be because a higher fiber concentration increases the probability of fiber retention, so fiber pads formed from the 1% slurry may be defect-free. Therefore, a higher drainage time is related to higher quality fiber pad formation because of one or more of the following mechanisms—(a) more uniform and complete fiber coverage, (b) denser and thicker fiber layer, and (c) faster fiber deposition.

From Tables (1)-(4), it was observed that regardless of fiber molding screen (100) arrangement, the slurry takes a longer time to drain than water, and the drainage times for water are similar. It was similarly observed that for the same pore trajectory angle (106) of 90°, higher tilt angles (214) of the screen of 60° or more gives higher drainage times. It was also observed that for the same tilt angle (214), smaller pore trajectory angles (106) may lead to longer drainage times, with larger tilt angles (106) accentuating the difference. It was also determined that higher screen surface porosity gives longer drainage times and a higher slurry consistency gives longer drainage times.

As such, 1) a smaller pore trajectory angle (106) may reduce the permeation of the fibers, 2) a higher screen tilt angle (214) may impose a tangential sheer on the surface, and 3) a higher surface porosity may mitigate the vacuum drag at the pore mouth. Accordingly, a fiber molding screen (100) may increase thickness uniformity by inducing a desirable slurry flow pattern under vacuum suction through one or any combination of the three parameters described above.

FIG. 3 depicts a fiber molding screen (100) with pores with different pore trajectory angles (FIG. 1, 106), according to an example of the principles described herein. Specifically, FIG. 3 depicts how pore trajectory varies across a fiber molding screen (100) with varying curvature. As depicted in FIG. 3, while the pore geometry and pore mouth cross-sectional area may remain the same across the fiber molding screen (100) surface, pore trajectory angles (FIG. 1, 106) on the curved region may be different and may align with a global reference plane. Note that while FIG. 3 depicts cylindrical pore trajectories, other pore trajectories may be implemented, which may result in longer travel paths which may increase the surface drag to further slow drainage.

Moreover, while FIG. 3 depicts pores with a circular cross-sectional area, the pores may have other cross-sectional areas so as to maintain an overall opening area (thus similar flow rate) all while reducing the likelihood of fiber entry through the pore. For example, the pores rather than being circular, may be a rectangular slot of high aspect ratio.

Figure 4:
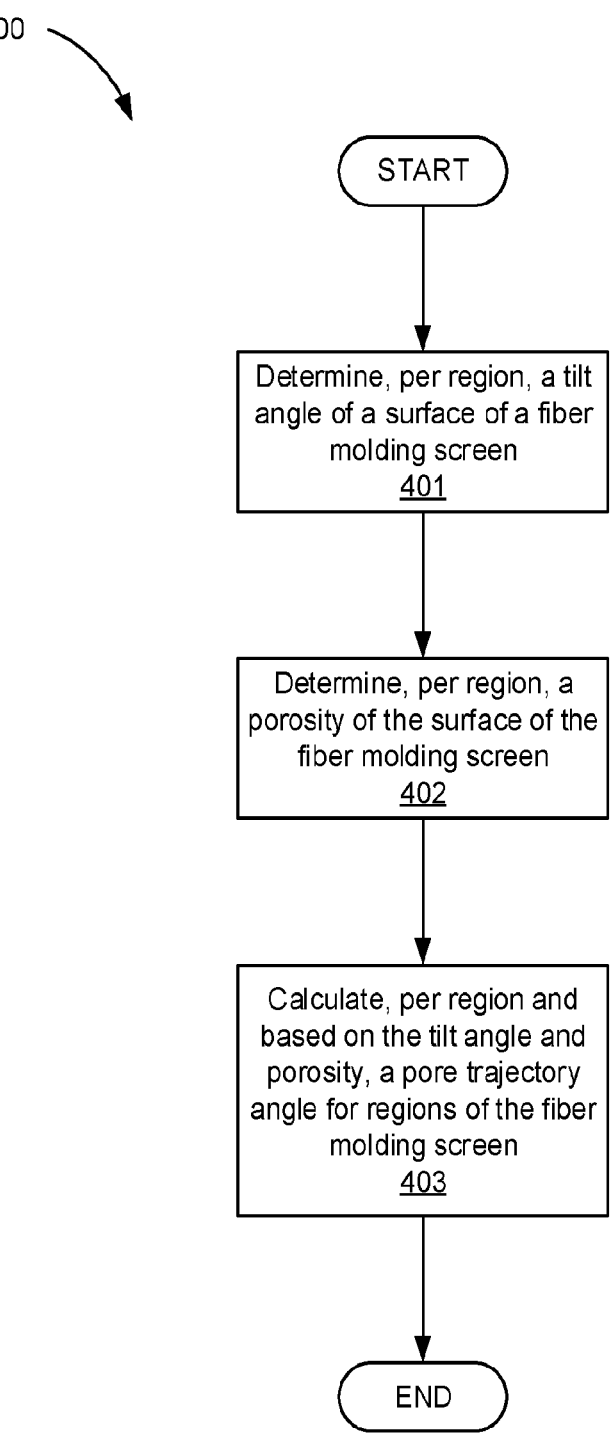
FIG. 4 is a flowchart of a method for generating a fiber molding screen with pores with different pore trajectory angles, according to an example of the principles described herein.

FIG. 4 is a flowchart of a method (400) for generating a fiber molding screen (FIG. 1, 100) with pores having different pore trajectory angles (FIG. 1, 106), according to an example of the principles described herein. In an example, a processor determines (block 401), per region (FIG. 1, 102) of a fiber molding screen (FIG. 1, 100), a tilt angle (FIG. 2, 214) of a surface of the region (FIG. 1, 102). That is, as described above, a fiber molding screen (FIG. 1, 100) may be a complex geometry with different regions (FIG. 1, 102) of the fiber molding screen (FIG. 1, 100) having different tilt angles (FIG. 2, 214) relative to a reference plane which may be horizontal. The pores that are found in these different regions may have different pore trajectory angles (FIG. 1, 106), which pore trajectory angles (FIG. 1, 106) may be based on the tilt angles (FIG. 2, 214) and/or porosity within the region (FIG. 1, 102).

Specifically, as described above, the tilt angle (FIG. 2, 214) may impact water flow through the fiber molding screen (FIG. 1, 100) and fiber retention on the fiber molding screen (FIG. 1, 100) surface. Accordingly, the pore trajectory angle (FIG. 1, 106) of the pores in a region (FIG. 1, 102) may be selected based on a tilt angle (FIG. 2, 214) so as to optimize water drainage and fiber retention through the region (FIG. 1, 102). For example, the pore trajectory angle (FIG. 1, 106) may be reduced, i.e., to a lower value angle, as the tilt angle (FIG. 2, 214) reduces, to a lower value angle.

The method (400) also includes determining (block 402), per region (FIG. 1, 102) of the fiber molding screen (FIG. 1, 100), a porosity of the surface of the region (FIG. 1, 102). Porosity, or the volume of the pores on the region surface, may impact water drainage and fiber retention with greater porosity leading to quicker water drainage. Accordingly, the pore trajectory angle (FIG. 1, 106) of a region (FIG. 1, 102) may be reduced as the quantity and overall volume of pores increases. As a specific example, a first region (FIG. 1, 102-1) may have a pore trajectory angle (FIG. 1, 106) of 60°, while a second region (FIG. 1, 102-2) with a second porosity that is greater than the first porosity may have a reduced pore trajectory angle (FIG. 1, 106) of 30°. The reduction in the pore trajectory angle (FIG. 1, 106) may offset the increased fluid flow through the more porous second region (FIG. 1, 102-2).

The method (400) also includes calculating (block 403) per region (FIG. 1, 102) of the fiber molding screen (FIG. 1, 100) and based on the tilt angle (FIG. 2, 214) and porosity for the region (FIG. 2, 214), a pore trajectory angle (FIG. 1, 106) for pores within the region (FIG. 1, 102). That is, as described above, porosity and tilt angle (FIG. 2, 214) may both have an impact on the flow of water through the fiber molding screen (FIG. 1, 100) and the fiber retention on the surface of the fiber molding screen (FIG. 1, 100). Accordingly, with these two parameters as input, the processor may set a pore trajectory angle (FIG. 1, 106) that would result in a desired drainage rate that would allow for flow through the fiber molding screen (FIG. 1, 100) that would result in a desired thickness and uniformity across the fiber molded product.

In an example, the calculation (block 403) of the pore trajectory angles (FIG. 1, 106) is done without user intervention other than providing the digital model. That is, a user may provide the digital model and the processor may determine the tilt angle (FIG. 2, 214) and porosity and calculate the pore trajectory angles (FIG. 1, 106) across the different regions (FIG. 1, 102). As the determination and calculation is calculated per region (FIG. 1, 102), such a method (400) may ensure that the fiber molded product has uniform thickness regardless of the tilt angle (FIG. 2, 214) of the fiber molded product and porosity on different surfaces of the fiber molding screen (FIG. 1, 100).

FIG. 5 is a flowchart of a method (500) for generating a fiber molding screen (FIG. 1, 100) with pores with different pore trajectory angles (FIG. 1, 106), according to an example of the principles described herein. As described above, the method (500) includes determining (block 501), per region (FIG. 1, 102), a tilt angle (FIG. 1, 106) of a surface of a fiber molding screen (FIG. 1, 100) and determining (block 502), again per region (FIG. 1, 102), a porosity of the surface of the fiber molding screen (FIG. 1, 100). These operations may be performed as described above in connection with FIG. 4.

In an example, the method (500) may also include determining (block 503) a pore shape of the pores within each region (FIG. 1, 102). That is, as described above, the pore trajectories may be cylindrical. However, in other examples, the pore trajectories may have a more complex path to increase water drainage time and fiber retention. Moreover, the cross-sectional area of a pore may be circular as depicted in FIG. 3 or may be a different shape, such as rectangular so as to decrease the likelihood of fiber passage through the pores.

The method (500) may also include calculating (block 504) a pore trajectory angle (FIG. 1, 106) for regions (FIG. 1, 102) of the fiber molding screen (FIG. 1, 100). This may also be performed as described above in connection with FIG. 4.

In an example, the method (500) may also include generating (block 505) the additive manufacturing file for the fiber molding screen (FIG. 1, 100). According to an example, a processor accesses a digital model of a fiber molding screen (FIG. 1, 100) to be fabricated. That is, the digital model of the fiber molding screen (FIG. 1, 100) may be a three-dimensional (3D) computer model, such as a computer aided design (CAD) file, or other digital representation of the fiber molding screen (FIG. 1, 100). In an example, the processor accesses the digital model of the fiber molding screen (FIG. 1, 100) from a data store (not shown) or some other source. In some examples, the digital model of the fiber molding screen (FIG. 1, 100) is generated using a CAD application. That is, the CAD application is used to define the physical geometry of the digital model.

As described above, the digital model defines the geometry of the fiber molding screen (FIG. 1, 100) to be fabricated. Based on this digital model, the processor determines the pore placement and pore trajectory angle (FIG. 1, 106) as described above. The digital model may then be modified to include the pores with their associated pore trajectory angles (FIG. 1, 106). That is, the processor modifies the digital model to include the determined pores. As such, the processor converts a modified digital model into a format usable by an additive manufacturing system to create the fiber molding screen (FIG. 1, 100). In an example, this includes converting the format of the digital model file to an additive manufacturing file format.

As a result, an additive manufacturing system employs the altered digital model to additively manufacture (block 506) the fiber molding screen (FIG. 1, 100). The additive manufacturing may take a variety of forms. For example, the fiber molding screen (FIG. 1, 100) may be formed by fusing build material particles together, which are fused together during an additive manufacturing process by an additive manufacturing system. In these examples, the build material particles may be any suitable type of material that is employed in 3D fabrication processes, such as, a metal, a plastic, a nylon, a ceramic, an alloy, and/or the like. In some examples, the screen is formed to have a relatively thin height and is relatively pliable as compared to the form tool. In other examples, the structures are formed through other fabrication techniques such as selective laser ablation, selective laser melting, stereolithography, fused deposition modeling, and/or the like.

That is, in some examples, the system forms part of the additive manufacturing system itself such that a single device is used to generate the additive manufacturing file and generate the fiber molding screen (FIG. 1, 100) itself. Note that as described above, the additive manufacturing may take a variety of forms fusing agent-based manufacturing, a binding agent-based manufacturing, selective laser sintering, selective laser melting, fused metal deposition, and stereolithography. As such, additively manufacturing (block 905) the fiber molding screen (FIG. 1, 100) includes forming the fiber molding screen (FIG. 1, 100) via any of the aforementioned, or other, additive manufacturing processes.

FIG. 6 depicts a non-transitory machine-readable storage medium (618) for generating a fiber molding screen (FIG. 1, 100) with pores with different pore trajectory angles (FIG. 1, 106), according to an example of the principles described herein. To achieve its desired functionality, a system includes various hardware components. Specifically, the system includes a processor and a machine-readable storage medium (618). The processor may be a semiconductor-based microprocessor, a central processing unit (CPU), an application specific integrated circuit (ASIC), a field-programmable gate array (FPGA), and/or other suitable hardware device.

The machine-readable storage medium (618) is communicatively coupled to the processor. The machine-readable storage medium (618) includes a number of instructions (620, 622, 624, 626, 628) for performing a designated function. In some examples, the instructions may be machine code and/or script code.

The machine-readable storage medium (618) causes the processor to execute the designated function of the instructions (620, 622, 624, 626, 628). The machine-readable storage medium (618) can store data, programs, instructions, or any other machine-readable data that can be utilized to operate the system. The machine-readable storage medium (618) can store machine readable instructions that the processor of the system can process, or execute. The machine-readable storage medium (618) can be an electronic, magnetic, optical, or other physical storage device that contains or stores executable instructions. Machine-readable storage medium (618) may be, for example, Random-Access Memory (RAM), an Electrically Erasable Programmable Read-Only Memory (EEPROM), a storage device, an optical disc, etc. The machine-readable storage medium (618) may be a non-transitory machine-readable storage medium (618) where the term "non-transitory" does not encompass transitory propagating signals.

Referring to FIG. 6, access instructions (620), when executed by the processor, cause the processor to, access a digital model of a fiber molding screen (FIG. 1, 100) to be fabricated, the digital model including a first region (FIG. 1, 102-1) and a second region (FIG. 1, 102-2). Determine instructions (622), when executed by the processor, cause the processor to determine, per region (FIG. 1, 102) of the fiber molding screen (FIG. 1, 100), a tilt angle (FIG. 2, 214) of a surface of the region (FIG. 1, 102) and a porosity of the surface of the region (FIG. 1, 102).

Define instructions (624), when executed by the processor, cause the processor to 1) define a first set (FIG. 1, 104-1) of pore for the first region (FIG. 1, 102-1), each pore of the first set (FIG. 1, 104-1) of pores having a first pore trajectory angle (FIG. 1, 106-1) between a longitudinal axis of the pore and the first region (FIG. 1, 102-1) surface and 2) define a second set (FIG. 1, 104-2) of pores for a second region (FIG. 1, 102-2), each pore of the second set (FIG. 1, 104-2) of pores having a second pore trajectory angle (FIG. 1, 106-2) between a longitudinal axis of the pore and the second region (FIG. 1, 104-2) surface. In this example, the second pore trajectory angle (FIG. 1, 106-2) is different than the first pore trajectory angle (FIG. 1, 106-1). Modify instructions (6260), when executed by the processor, cause the processor to modify the digital model of the fiber molding screen (FIG. 1, 100) to include the first set (FIG. 1, 104-1) of pores in the first region (FIG. 1, 102-1) and the second set (FIG. 1, 104-2) of pores in the second region (FIG. 1, 102-2). Additive manufacturing file instructions (628), when executed by the processor, also cause the processor to, generate an additive manufacturing file for the fiber molding screen (FIG. 1, 100) with the first set (FIG. 1, 104-1) of pores and the second set of pores (FIG. 1, 104-2) represented in the digital model of the fiber molding screen (FIG. 1, 100).

In summary, using such a 3D-printed fiber molding screen may, for example, 1) allow for screen fabrication to control slurry flow; 2) provide for molded fiber products with increased thickness uniformity; and 3) enhance drainage time to increase molded fiber product strength. However, it is contemplated that the compute devices disclosed herein may address other matters and deficiencies in a number of technical areas, for example.

The invention claimed is:

1. A method comprising:

for each of a plurality of regions of a fiber molding screen to be used to manufacture a molded fiber product in a shape of the screen by suctioning a slurry of fiber through the screen such that the molded fiber product is formed as the fiber which collects against a surface of the screen via the suctioning:

determining, by a processor, a tilt angle of the surface of the screen in the region relative to a reference surface, where a first region of the screen of the screen has a smaller tilt angle than a second region of the screen;

determining, by the processor, a porosity of the surface of the screen in the region, where a third region of the screen has a greater porosity than a fourth region of the screen; and calculating, by the processor, a pore trajectory angle for pores within the region relative to the reference surface, based on the tilt angle and the porosity of the region, such that the molded fiber product when manufactured using the screen has a specified thickness that is uniform across all the regions of the screen; and additively manufacturing the fiber molding screen such that the pores within each region of the screen have the pore trajectory angle calculated for the region.

2. The method of claim 1, further comprising generating an additive manufacturing file for the fiber molding screen such that the pores within each region have the pore trajectory angle calculated for the region, wherein additively manufacturing the fiber molding screen comprises causing an additive manufacturing apparatus to additively manufacture the screen using the additive manufacturing file that has been generated.

3. The method of claim 1, wherein calculating the pore trajectory angle for the pores within each region results in the first region having a reduced trajectory angle compared to the second region due to the tilt angle of the first region being smaller than the tilt angle of the second region.

4. The method of claim 1, wherein calculating the pore trajectory angle for the pores within each region results in the third region having a reduced trajectory angle compared to the fourth region due to the porosity of the third region being greater than the porosity of the fourth region.

5. The method of claim 1, wherein the first region is the third region and the second region is the fourth region, or the first region is the fourth region and the second region is the third region.

6. The method of claim 1, further comprising manufacturing the molded fiber product using the fiber molding screen, such that the molded fiber product has the specified thickness that is uniform across all the regions of the screen due to the pores within each region of the screen having the pore trajectory angle calculated for the region.

7. A non-transitory machine-readable storage medium encoded with instructions that when executed by a processor, cause the processor to perform processing comprising:

for each of a plurality of regions of a fiber molding screen to be used to manufacture a molded fiber product in a shape of the screen by suctioning a slurry of fiber through the screen such that the molded fiber product is formed as the fiber which collects against a surface of the screen via the suctioning:

determining a tilt angle of the surface of the screen in the region relative to a reference surface, where a first region of the screen of the screen has a smaller tilt angle than a second region of the screen;

determining a porosity of the surface of the screen in the region, where a third region of the screen has a greater porosity than a fourth region of the screen; and calculating a pore trajectory angle for pores within the region relative to the reference surface, based on the tilt angle and the porosity of the region, such that the molded fiber product when manufactured using the screen has a specified thickness that is uniform across all the regions of the screen; and causing the fiber molding screen to be additively manufactured such that the pores within each region of the screen have the pore trajectory angle calculated for the region.

8. The non-transitory machine-readable storage medium of claim 7, wherein the processing further comprises generating an additive manufacturing file for the fiber molding screen such that the pores within each region have the pore trajectory angle calculated for the region, and wherein causing the fiber molding screen to be additively manufactured comprises causing an additive manufacturing apparatus to additively manufacture the screen using the additive manufacturing file that has been generated.

9. The non-transitory machine-readable storage medium of claim 7, wherein calculating the pore trajectory angle for the pores within each region results in the first region having a reduced trajectory angle compared to the second region due to the tilt angle of the first region being smaller than the tilt angle of the second region.

10. The non-transitory machine-readable storage medium of claim 7, wherein calculating the pore trajectory angle for the pores within each region results in the third region having a reduced trajectory angle compared to the fourth region due to the porosity of the third region being greater than the porosity of the fourth region.

11. The non-transitory machine-readable storage medium of claim 7, wherein the first region is the third region and the second region is the fourth region, or the first region is the fourth region and the second region is the third region.

12. The non-transitory machine-readable storage medium of claim 7, wherein the processing further comprises manufacturing the molded fiber product using the fiber molding screen, such that the molded fiber product has the specified thickness that is uniform across all the regions of the screen due to the pores within each region of the screen having the pore trajectory angle calculated for the region.

* * * * *